(12) United States Patent
Ju

(10) Patent No.: US 7,313,790 B2
(45) Date of Patent: Dec. 25, 2007

(54) METHODS AND APPARATUS FOR PRESERVING PRECISE EXCEPTIONS IN CODE REORDERING BY USING CONTROL SPECULATION

(75) Inventor: Dz-ching Ju, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 709 days.

(21) Appl. No.: 10/601,439

(22) Filed: Jun. 23, 2003

(65) Prior Publication Data

US 2004/0261068 A1  Dec. 23, 2004

(51) Int. Cl.
*G06F 9/45* (2006.01)
(52) U.S. Cl. .................... 717/159; 712/244
(58) Field of Classification Search ............ 717/159
See application file for complete search history.

(56) References Cited

U.S. PATENT DOCUMENTS

| | | | | |
|---|---|---|---|---|
| 6,247,172 B1 * | 6/2001 | Dunn et al. | ............ | 717/141 |
| 6,260,190 B1 * | 7/2001 | Ju | ............ | 717/156 |
| 6,463,579 B1 * | 10/2002 | McKinsey | ............ | 717/146 |
| 6,487,716 B1 * | 11/2002 | Choi et al. | ............ | 717/159 |
| 6,634,023 B1 * | 10/2003 | Komatsu et al. | ............ | 717/159 |
| 7,065,750 B2 * | 6/2006 | Babaian et al. | ............ | 717/136 |
| 7,103,880 B1 * | 9/2006 | Morris et al. | ............ | 717/140 |
| 7,103,882 B2 * | 9/2006 | Kawahito | ............ | 717/151 |

OTHER PUBLICATIONS

Intel® Itanium® Architecture Software Developer's Manual, vol. 3: Instruction Set Reference, Revision 2.1, Oct. 2002, Document No. 245319-004, 958 pages.

Kemal Ebcioglu and Erik R. Altman, *Daisy: Dynamic Compilation for 100% Architectural Compatibility*, IBM Research Division (Aug. 5, 1996).

Bich C. Le, *An Out-of-Order Execution Technique for Runtime Binary Translators*, Hewlett Packard Company (1998).

Erik M. Nystrom et al., *Code Reordering and Speculation Support for Dynamic Optimization Systems*, University of Illinois, Urbana-Champagne. (2001).

* cited by examiner

*Primary Examiner*—Tuan Dam
*Assistant Examiner*—Michael Yigdall
(74) *Attorney, Agent, or Firm*—Hanley Flight & Zimmerman, LLC

(57) ABSTRACT

Methods and apparatus for preserving precise exceptions in code reordering by using control speculation are disclosed. A disclosed system uses a control speculation module to reorder instructions within an application program and preserve precise exceptions. Instructions, excepting and non-excepting, can be reordered by the control speculation module if the instructions meet certain conditions. When an excepting instruction is reordered, a check instruction is inserted into the program execution path and a recovery block is generated. The check instruction determines if the reordered excepting instruction actually needs to generate an exception. The recovery block contains instructions to revert the effects of code reordering. If the check instruction detects the need for an exception, the recovery block is executed to restore the architectural state of the processor and the exception is handled.

10 Claims, 10 Drawing Sheets

METHODS AND APPARATUS FOR PRESERVING PRECISE EXCEPTIONS IN CODE REORDERING BY USING CONTROL SPECULATION

TECHNICAL FIELD

The present disclosure pertains to code reordering and, more particularly, to methods and an apparatus for preserving precise exceptions in code reordering by using control speculation.

BACKGROUND

Code reordering allows an instruction or sequence of instructions to be executed before it is known that the dynamic code flow actually reaches the point in the program where the sequence of instructions is needed. This has the benefit of removing latency in program flow by attempting to look ahead. Code reordering allows for improved performance of application programs because instructions can be executed in advance. However, the reordered code sequence could produce a different architectural state than the normal code flow would create, due to reordered instructions generating exceptions that would not have otherwise been generated. In certain environments where precise exceptions must be preserved, such as binary translation, this may be unacceptable.

Methods have been presented that solve the problem of preserving precise exceptions, but all of these methods incur some additional cost in hardware, processing speed, and/or memory. Some of these methods require additional registers be set aside that are not accessible for general use and require additional processing to restore the architectural state. Other methods require additional hardware support and memory to store the speculated register values and use the original code sequence to restore the architectural state.

DETAILED DESCRIPTION

Generally, the disclosed system uses a control speculation module to reorder instructions within an application program and preserve precise exceptions. Excepting instructions are relocated and their exceptions are preserved by deferring the exception and detecting the exception at a later time. Other instructions (i.e., non-excepting instructions) can also be relocated within the application program using the control speculation module. When instructions are relocated, a recovery block is generated. The recovery block includes instructions that are executed to restore the processor's architectural state to a state as if the code reordering had not taken place (e.g., as if normal program flow had been effectively executed). If a deferred exception is detected, the recovery block is executed, the architectural state is restored and the exception is handled at that time.

Figure 1:
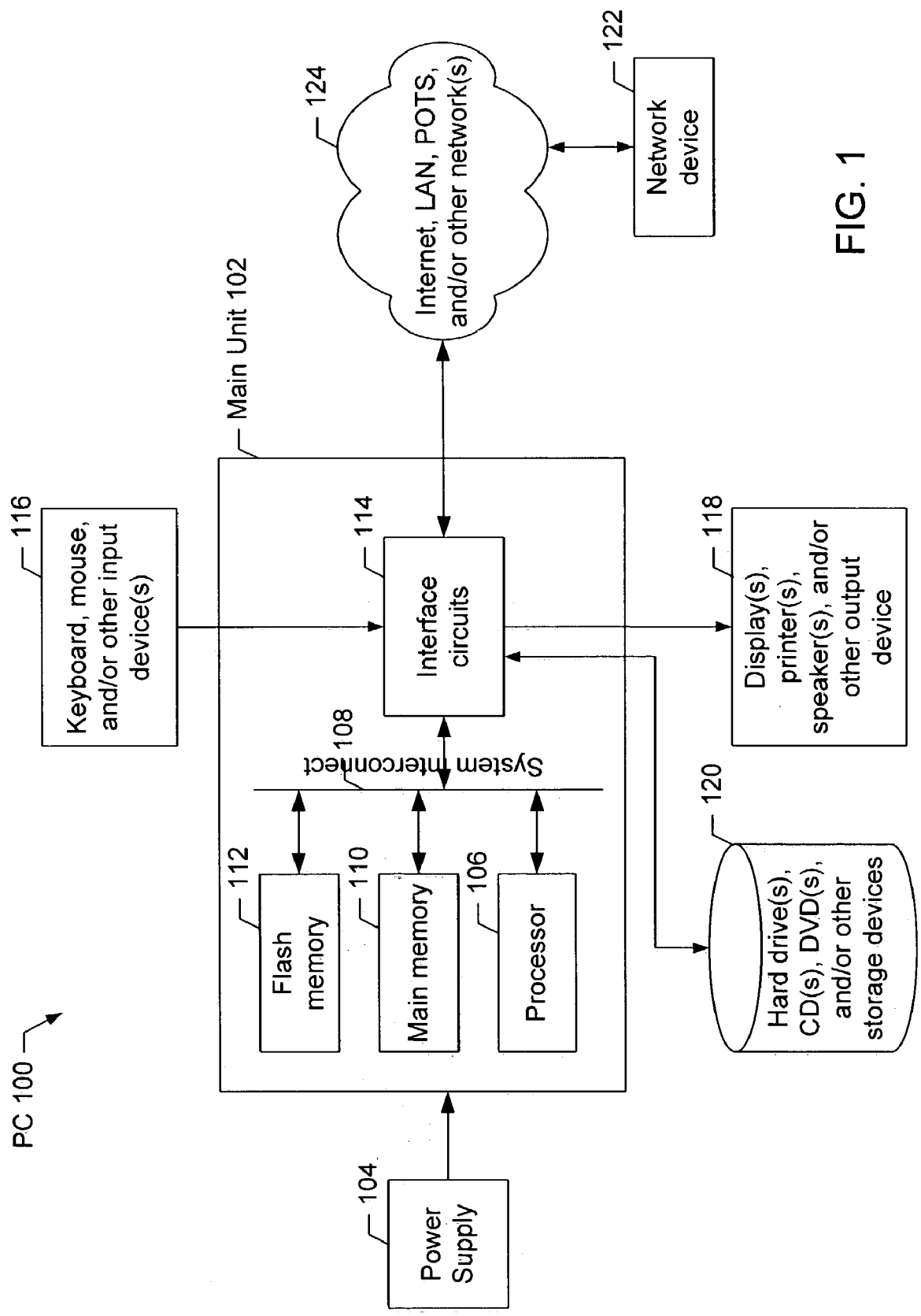
FIG. 1 is a block diagram of an exemplary embodiment of a computer system illustrating an environment of use for the disclosed system.

FIG. 1 is a block diagram of an exemplary embodiment of a computer system illustrating an environment of use for the disclosed system. The computer system 100 may be a personal computer (PC) or any other computing device. In the exemplary embodiment illustrated, the computer system 100 includes a main processing unit 102 powered by a power supply 104. The main processing unit 102 may include a processor 106 electrically coupled by a system interconnect 108 to a main memory device 110, a flash memory device 112, and one or more interface circuits 114. In an exemplary embodiment, the system interconnect 108 is an address/data bus. Of course, a person of ordinary skill in the art will readily appreciate that interconnects other than busses may be used to connect the processor 106 to the other devices 110, 112, and 114. In an exemplary embodiment, one or more dedicated lines and/or a crossbar may be used to connect the processor 106 to the other devices 110, 112, and 114.

The processor 106 may be any type of well known processor, such as a processor from the Intel Pentium® family of microprocessors, the Intel Itanium® family of microprocessors, the Intel Centrino® family of microprocessors, and/or the Intel XScale® family of microprocessors. In addition, the processor 106 may include any type of well known cache memory, such as static random access memory (SRAM). The main memory device 110 may include dynamic random access memory (DRAM) and/or any other form of random access memory. In an exemplary embodiment, the main memory device 110 may include double data rate random access memory (DDRAM). The main memory device 110 may also include non-volatile memory. In an exemplary embodiment, the main memory device 110 stores a software program which is executed by the processor 106 in a well known manner. The flash memory device 112 may be any type of flash memory device. The flash memory device 112 may store firmware used to boot the computer system 100.

The interface circuit(s) 114 may be implemented using any type of well known interface standard, such as an Ethernet interface and/or a Universal Serial Bus (USB) interface. One or more input devices 116 may be connected to the interface circuits 114 for entering data and commands into the main processing unit 102. In an exemplary embodiment, an input device 116 may be a keyboard, mouse, touch screen, track pad, track ball, isopoint, and/or a voice recognition system.

One or more displays, printers, speakers, and/or other output devices 118 may also be connected to the main processing unit 102 via one or more of the interface circuits 114. The display 118 may be a cathode ray tube (CRT), a liquid crystal displays (LCD), or any other type of display. The display 118 may generate visual indications of data generated during operation of the main processing unit 102. The visual indications may include prompts for human operator input, calculated values, detected data, etc.

The computer system 100 may also include one or more storage devices 120. In an exemplary embodiment, the computer system 100 may include one or more hard drives, a compact disk (CD) drive, a digital versatile disk drive (DVD), and/or other computer media input/output (I/O) devices.

The computer system 100 may also exchange data with other devices 122 via a connection to a network 124. The network connection may be any type of network connection, such as an Ethernet connection, digital subscriber line (DSL), telephone line, coaxial cable, etc. The network 124 may be any type of network, such as the Internet, a telephone network, a cable network, and/or a wireless network. The network devices 122 may be any type of network devices 122. In an exemplary embodiment, the network device 122 may be a client, a server, a hard drive, etc.

Figure 2:
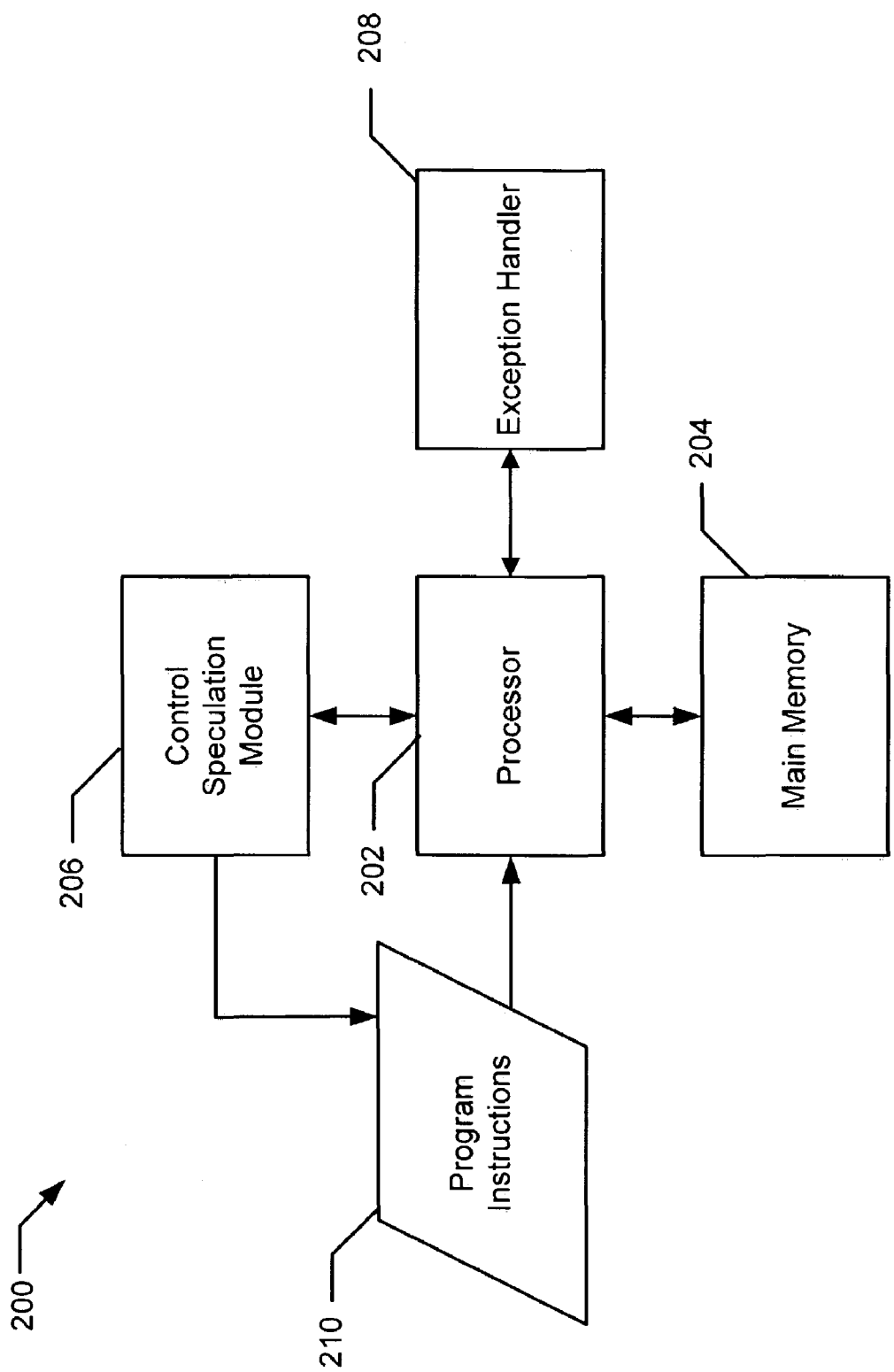
FIG. 2 is a block diagram of another exemplary embodiment of a computer system illustrating an environment of use for the disclosed system.
Figure 3:
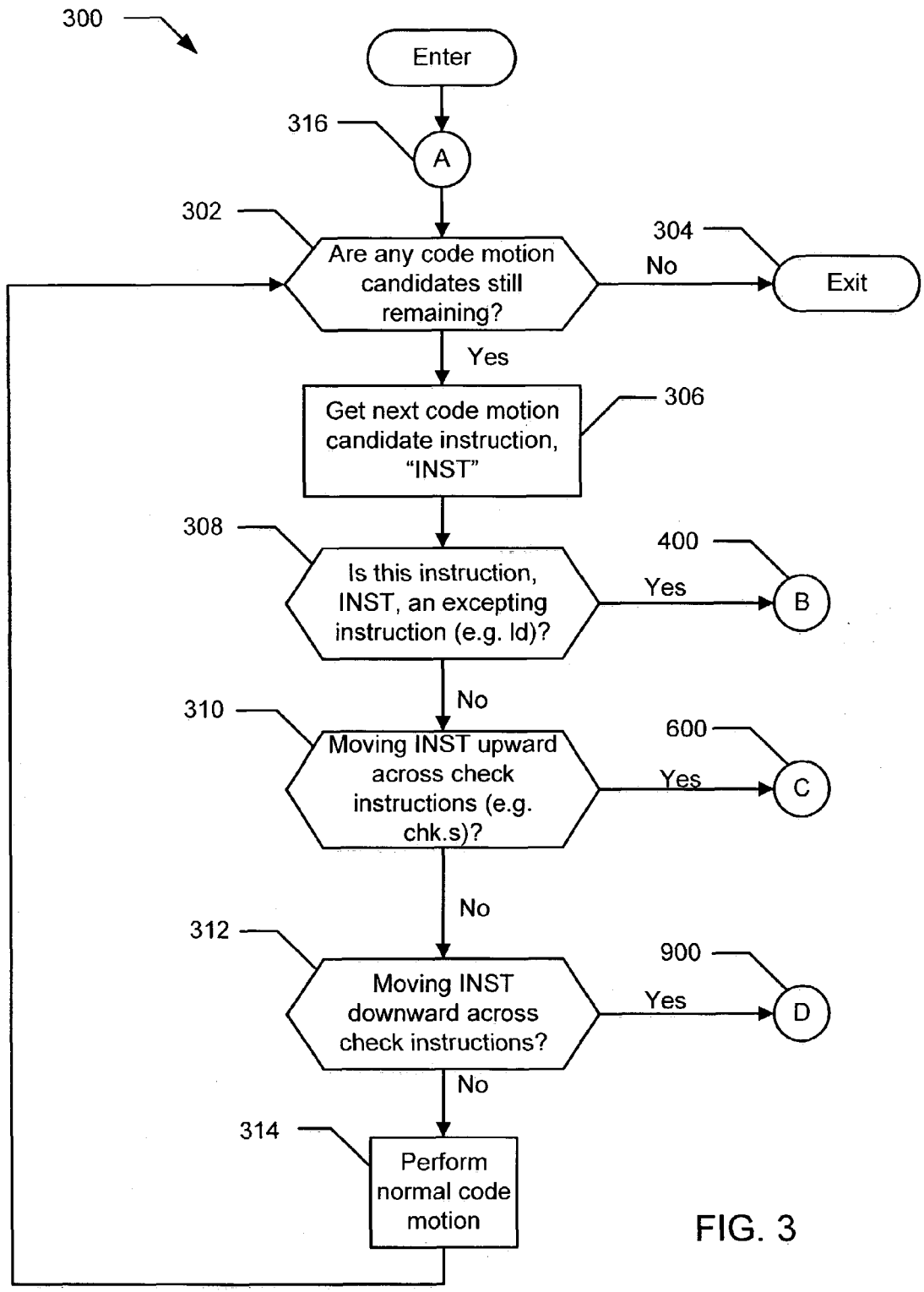
FIG. 3 is a flowchart representative of example machine readable instructions which may be executed by a device to implement an exemplary embodiment of a method of code reordering while preserving precise exceptions.

Another exemplary embodiment computer system 200 is illustrated in FIG. 2. In this exemplary embodiment, the computer system 200 includes a processor 202, a control speculation module 206, a main memory 204, an exception handler 208, and program instructions 210.

Again, the processor 202 may be any type of well known processor, such as a processor from the Intel Pentium® family of microprocessors, the Intel Itanium® family of microprocessors, the Intel Centrino® family of microprocessors, and/or the Intel XScale® family of microprocessors. The main memory device 204 may include dynamic random access memory (DRAM) and/or any other form of random access memory. In an exemplary embodiment, the main memory device 204 may include double data rate random access memory (DDRAM). The main memory device 204 may also include non-volatile memory. In an exemplary embodiment, the main memory device 204 stores a software program which is executed by the processor 202 in a well known manner.

Typically, the processor 202 fetches one or more instructions from the program instructions 210 and performs the operation(s) defined by each fetched instruction in the order the instructions 210 are listed. These instructions 210 can be any instruction from the processor's instruction set, such as mathematical/logical operations and/or memory operations.

In an exemplary embodiment, program instructions 210 may be executed out of order, due to the presence of a control speculation module 206. The control speculation module 206 allows the instructions 210 to be reordered and executed before it is known that the dynamic code flow actually reaches the point in the program 210 where the reordered instructions are needed. This may have the effect of improving application performance.

An excepting instruction is an instruction that may cause an exception to occur. When an excepting instruction in the program 210 is reordered, problems can arise. Typically, when an excepting instruction signals that an exception has occurred the exception handler 208 services the exception by a prescribed method. The prescribed method may include, but is not limited to, saving the address of the offending instruction and/or transferring control of the computer system 100 to some other application or program at some specified address. In an exemplary embodiment, arithmetic overflow is an exception that could be generated by a multiplication instruction. When the arithmetic overflow is detected by the processor 202, the address of the multiplication instruction is stored. Subsequently, the exception handler 208 gives control to the computer system 100 to handle the exception.

Problems may occur due to the fact the reordered excepting instruction, which could generate an exception, may not actually need to be executed according to the original program flow. In an exemplary embodiment, if a load instruction is reordered, and the load instruction is executed before the load instruction would have been executed by the original (i.e., non-reordered) program flow, the load instruction may generate an exception. However, this exception may not actually need to be handled since the program's original dynamic flow may not have actually executed the load instruction. Accordingly, when a reordered excepting instruction generates an exception, the exception is deferred, and control is not transferred to the exception handler 208. Instead, execution of the program instructions 210 continues in the reordered sequence until it reaches a point where the excepting instruction would have been executed by the original program flow (i.e., a deferred exception point). When the deferred exception point is reached and the deferred exception is detected, the excepting instruction is re-executed, and the exception handler 208 is allowed to take control at that time.

FIGS. 3-10 are flowcharts representative of example machine readable instructions which may be executed by a device to implement an example method of preserving precise exceptions in code reordering by using control speculation. Preferably, the six illustrated processes (e.g., 300, 400, 600, 700, 800, and 900) are embodied in one or more software programs which are stored in one or more memories (e.g., flash memory 112 and/or hard disk 120) and executed by one or more processors (e.g., processor 106) in a well known manner. However, some or all of the blocks of the processes 300, 400, 600, 700, 800, and 900 may be performed manually and/or by some other device. Although the processes 300, 400, 600, 700, 800, and 900 are described with reference to the flowcharts illustrated in FIG. 3-10, a person of ordinary skill in the art will readily appreciate that many other methods of performing the six processes 300, 400, 600, 700, 800, and 900 may be used. In an exemplary embodiment, the order of many of the blocks may be altered, the operation of one or more blocks may be changed, blocks may be combined, and/or blocks may be eliminated.

In general, the example process 300 uses a control speculation module 206 to reorder a program's instructions 210 to improve performance of application programs. Control speculation allows the program's instructions 210 to be reordered so that one ore more instructions are executed out of an original order. In addition, control speculation allows exceptions generated by the reordered instruction(s) to be deferred and handled at a later time in the program's instruction execution path. The architectural state, such as register contents, may be restored to a state as if code reordering had not taken place. This may be accomplished by executing instructions located in a recovery block. In other words, the recovery block includes a sequence of instructions to revert the effects of the code reordering.

The process 300 begins by inspecting the program's instructions 210 and determines if any code motion candidates remain (block 302). A code motion candidate is an instruction that can be reordered. A compiler or binary translator application may determine, in a well known manner, when moving the code motion candidate is potentially advantageous for increasing processing throughput. If no code motion candidates exist, the process 300 exits (block 304). If a code motion candidate exists, the process 300 determines if the code motion candidate satisfies certain conditions. Depending on the conditions satisfied, one of the processes 400, 600, or 900 is launched. Specifically, the code motion candidate, "INST", is inspected to determine if it is an "excepting instruction." An excepting instruction is an instruction that may cause an internal exception within a processor (e.g., processor 106 or processor 202) (block 308). In an exemplary embodiment, a "load" instruction may be an excepting instruction.

Figure 4:
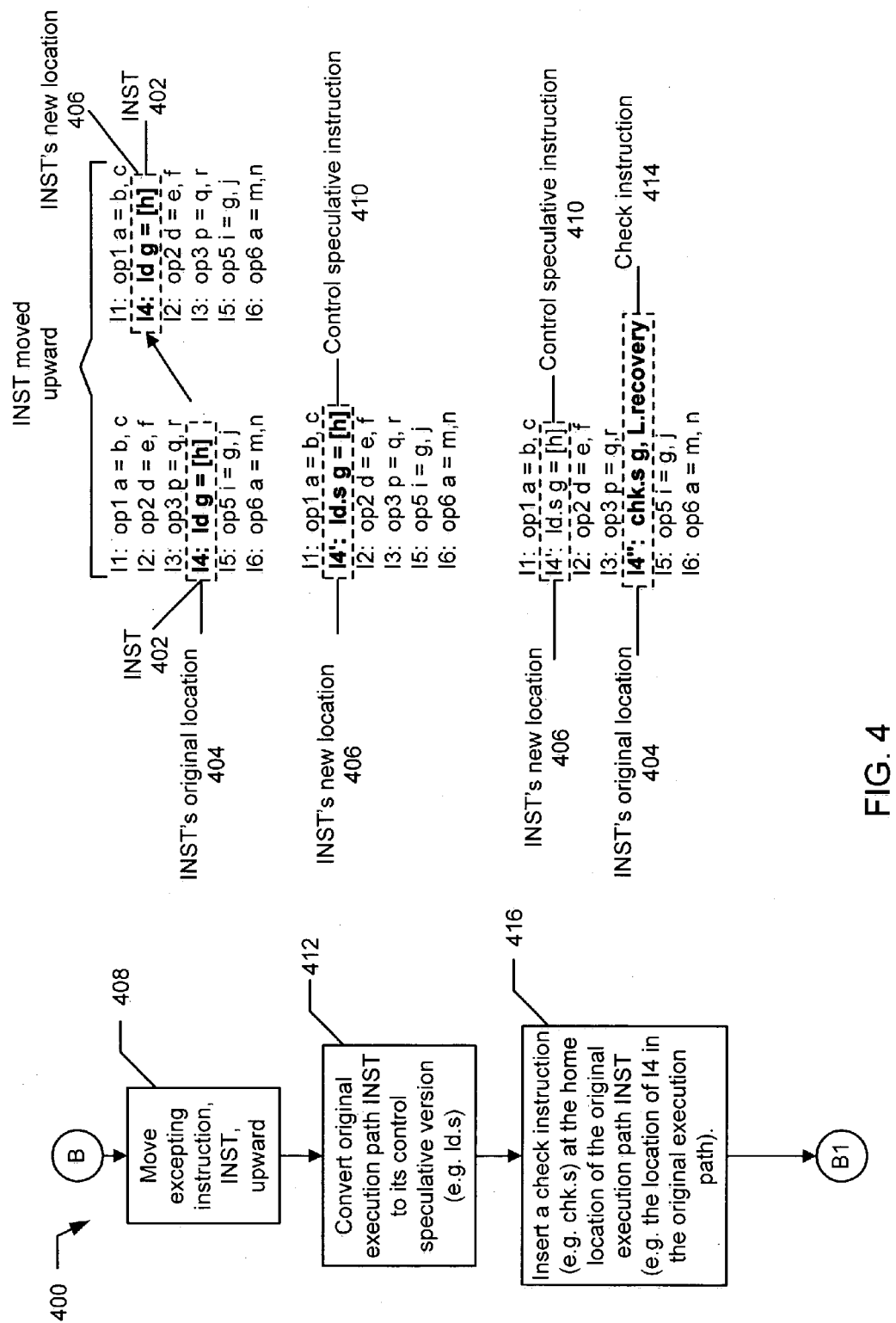
FIG. 4 is a flowchart representative of example machine readable instructions which may be executed by a device to implement an exemplary embodiment of a method of reordering excepting instructions.

If the code motion candidate, INST, is an excepting instruction a process 400, shown in FIG. 4, begins. In process 400, INST 402 is moved upward in the program's execution sequence from an original location 404 to a new location 406 which allows INST 402 to be executed at an earlier time (block 408). INST 402 is used to refer to a specific exemplary embodiment of INST, where INST is a reordered excepting instruction.

Next, INST 402 is converted to a control speculative instruction 410 (block 412). There are several different ways to implement the conversion of an instruction into a control speculative version of the instruction. One method to implement the conversion is by using a lookup table to store the control speculative instruction. In an exemplary embodiment, when a "ld" instruction needs to be converted, the process 400 may access the lookup table and determine the appropriate control speculative instruction is "ld.s".

Figure 5:
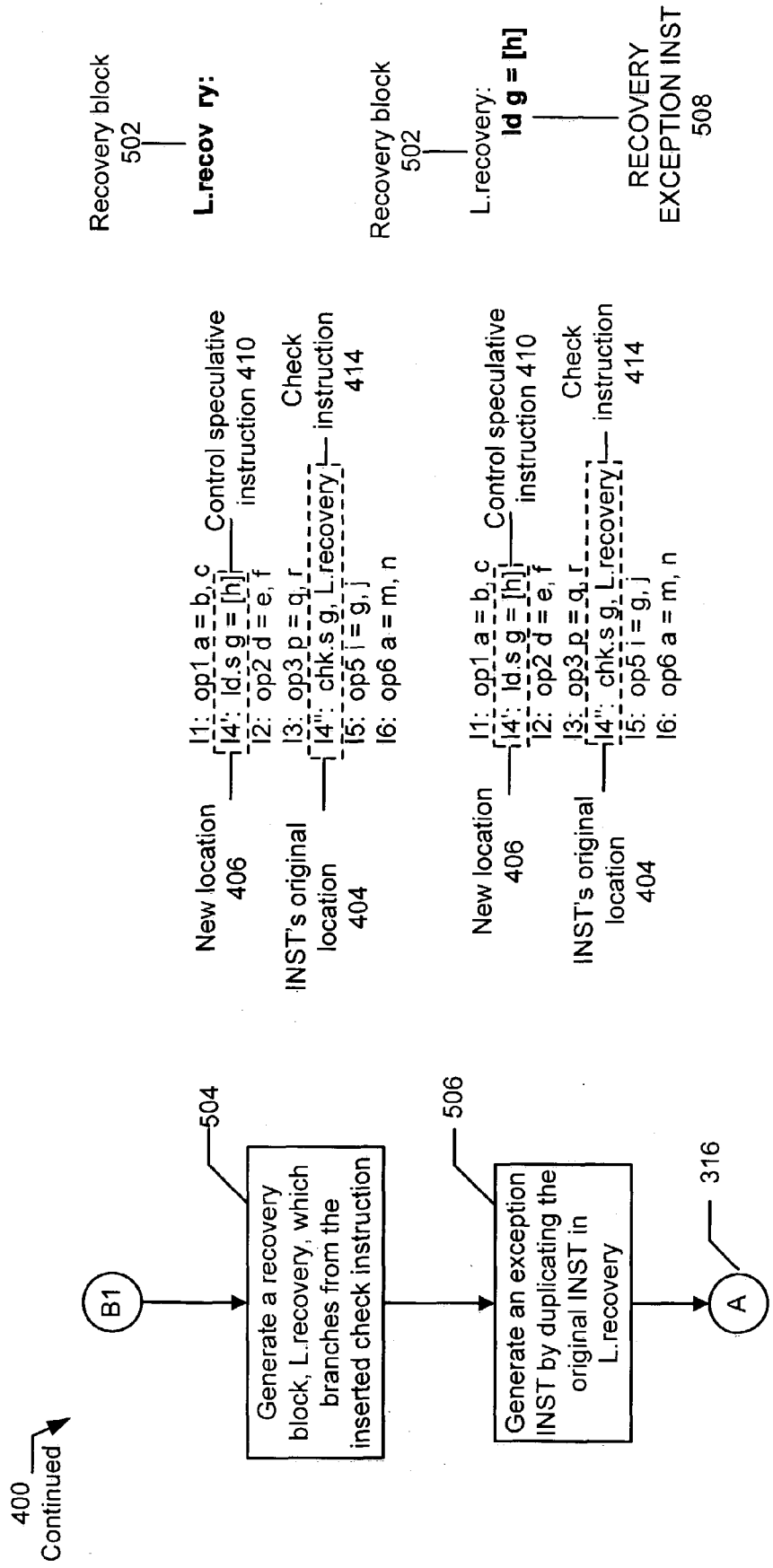
FIG. 5 is a continuation of the flowchart shown in FIG. 4.
Figure 6:
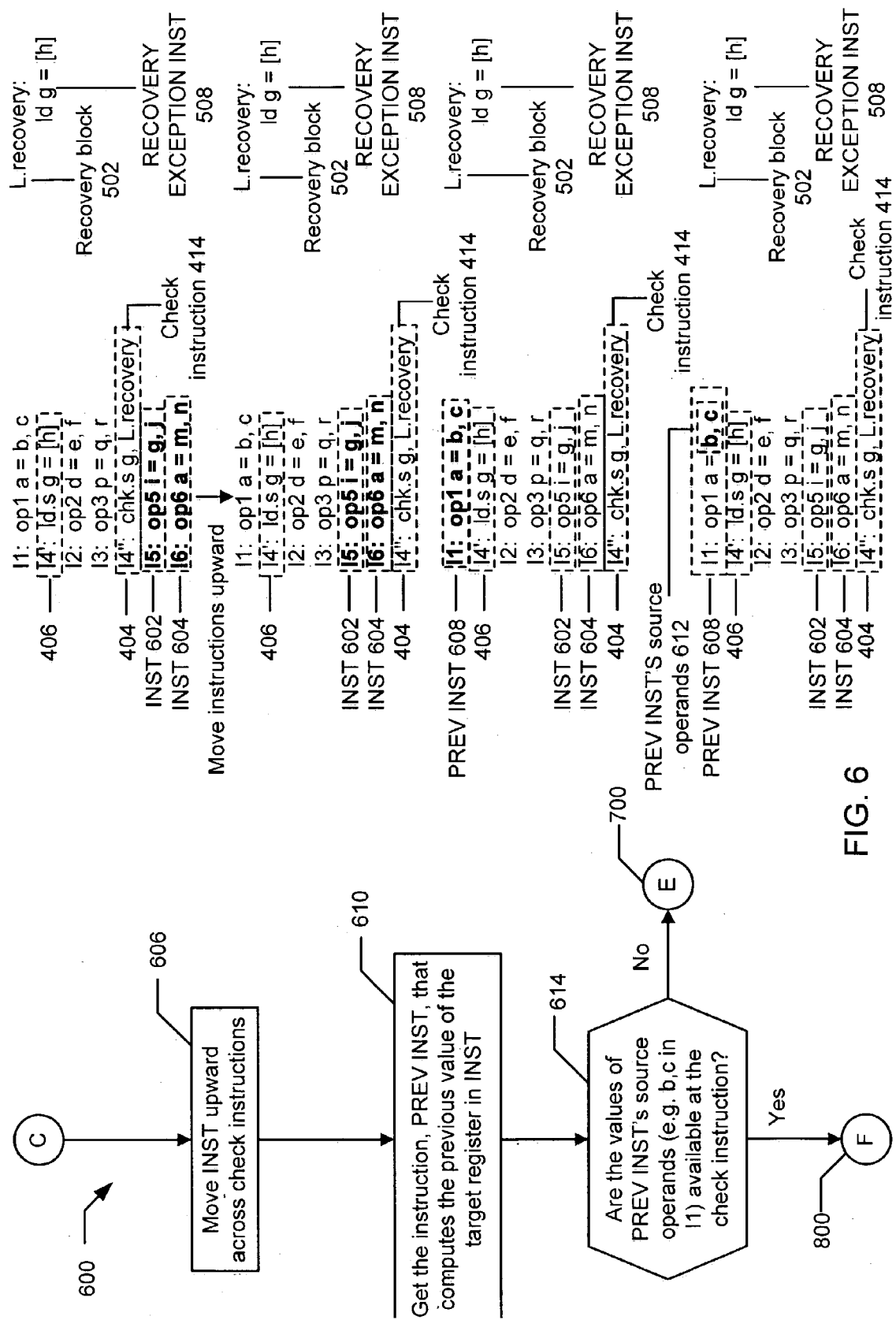
FIG. 6 is a flowchart representative of example machine readable instructions which may be executed by a device to implement an exemplary embodiment of a method of reordering instructions upward across a check instruction.
Figure 7:
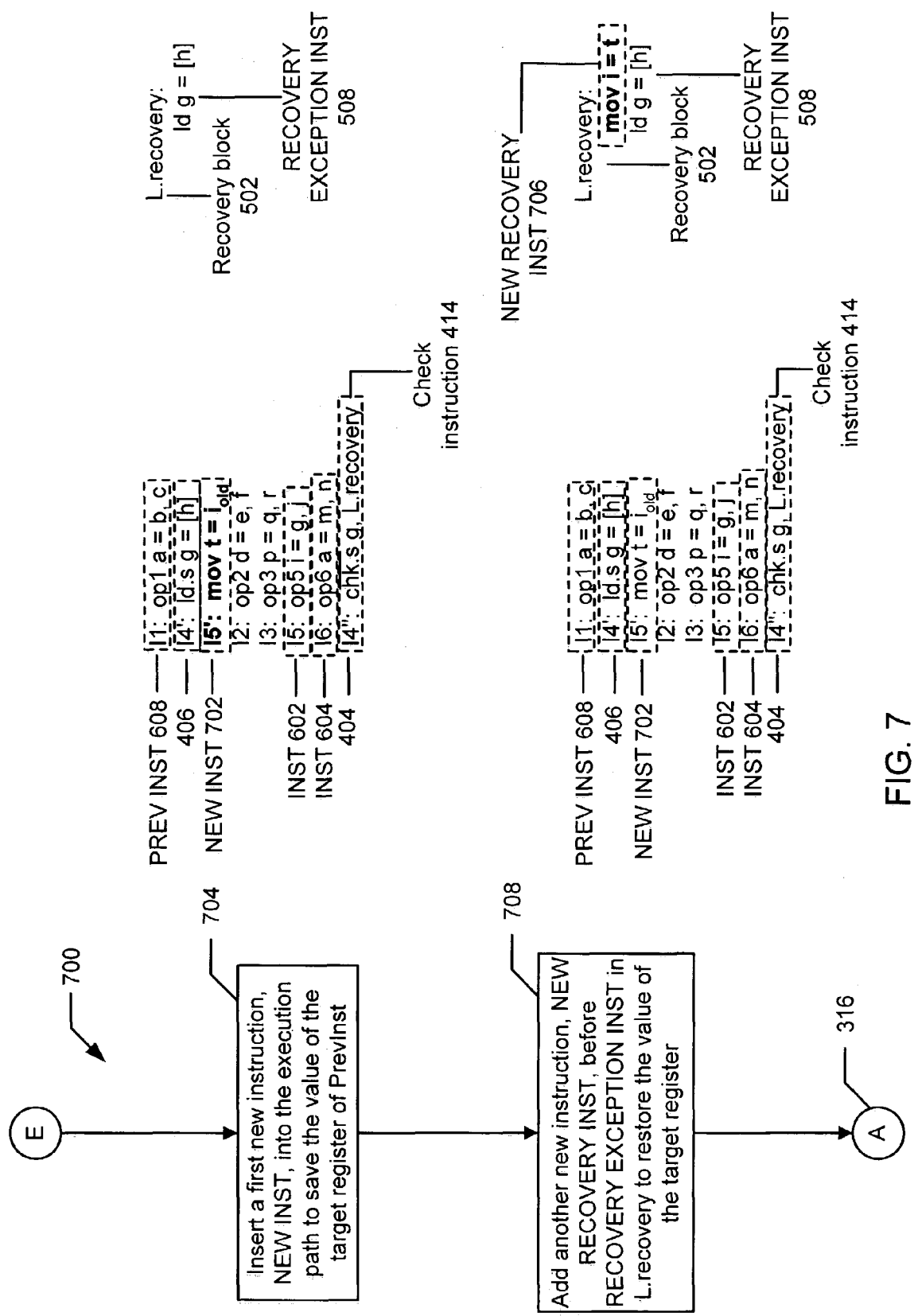
FIG. 7 is a flowchart representative of example machine readable instructions which may be executed by a device to implement an exemplary embodiment of a method of reordering instructions upward across a check instruction, wherein a target register associated with the instructions is dependent on the excepting instruction.

Next, a check instruction 414 (e.g. chk.s) is inserted at INST 402's original location 404, in the program execution path (block 416), and a recovery block 502 is generated (see FIG. 5, block 504). The recovery block 502 is an instruction or a set of instructions that can be used to restore the processor's architectural state. If the recovery block 502 needs to be executed, the check instruction 414 branches to the recovery block 502. In an exemplary embodiment, the control speculation module 206 can check a status bit or a number of status bits, to determine if the recovery block 502 needs to be executed. If the status bits indicate the recovery block 502 should be executed, the program flow will continue to the recovery block 502. The excepting instruction, INST 402, is duplicated in the recovery block 502 and is herein referred to as RECOVERY EXCEPTION INST 508 (block 506).

After the excepting instruction, INST 402, has been re-ordered, and the appropriate recovery block 502 has been generated, the process 400 exits and returns to the process 300. The process 300 then continues to determine if any code motion candidates still remain (block 302).

If INST is not an excepting instruction, the process 300 determines if INST will be moved upward across a check instruction (e.g., check instruction 414), such that INST is executed before the check instruction 414 (block 310). If INST will be moved upward across the check instruction 412, then a process 600 begins, (see FIG. 6). The process 600 begins by moving INST (e.g., instruction 602 and instruction 604) upward across the check instruction 414 (block 606). INST 602 and INST 604 are exemplary embodiments of INST that are reordered upward across the check instruction 414.

Next, process 600 finds the instruction, "PREV INST" (e.g., instruction 608) (block 610). PREV INST 608 is an instruction which computes the previous value of the target register of INST 604 (i.e., the register which stores the result of INST 604). In an exemplary embodiment, the process 600 uses a cache structure to find PREV INST 604. The cache structure may store the most recent instruction to modify each register and the address of each of the instructions within the original program. When INST 604 is reordered across the check instruction 414, the control speculation module 206 may inspect the cache structure and attempt to find the most recent instruction that modifies INST 604's target register (e.g., PREV INST 608). Another method to find PREV INST 604, is to use software to traverse the program instructions 210 and find the instruction which most recently modified the target register of INST 604.

The process 600 then determines if PREV INST's source operands 612 (i.e., the registers or values PREV INST 608 uses for its operation) are available at the check instruction 414 (block 614). A cache structure similar to the one described above for finding PREV INST 608 can be used to determine if source operands are available. In an exemplary embodiment, in FIG. 6, I1 is PREV INST for instruction 16. The operands b and c are I1's source operands 612. The cache structure may store the addresses of instructions that modify operand registers and some number of recently used memory locations. By examining the instruction address of the instruction that most recently modified the source operands 612 in question, the process 600 can determine if the source operands 612 are available.

INST 602 represents an instruction where the source operands are not available at the check instruction 414. For the case where the source operands are not available, a process 700 begins (see FIG. 7). A new instruction 702, "NEW INST", is inserted into the program's execution path to save PREV INST's target register (block 704). NEW INST 702 may be any instruction that assigns the contents of PREV INST's target register to an unused register or to some other memory location. In the exemplary embodiment illustrated, NEW INST 702 is an instruction that stores the value of register i into a temporary location t.

Another new instruction 706, "NEW RECOVERY INST", is inserted into the recovery block 502 and is placed before RECOVERY EXCEPTION INST 508 (block 708). When the recovery block 502 is executed, PREV INST's target register is restored by NEW RECOVERY INST 706. NEW RECOVERY INST 706 may be any instruction that restores PREV INST's target register to the value stored by NEW INST 702. In an exemplary embodiment, in FIG. 7, NEW RECOVERY INST 706 is an instruction that moves the value stored in the temporary location t to PREV INST's target register, i. This results in the contents of i being restored to its normal code flow contents.

After NEW INST 702 has been inserted into the program execution path and NEW RECOVERY INST 706 has been inserted into the recovery block 502, the process 700 exits and returns to the process 300. The process 300 then continues and determines if any code motion candidates still remain (block 302).

Figure 8:
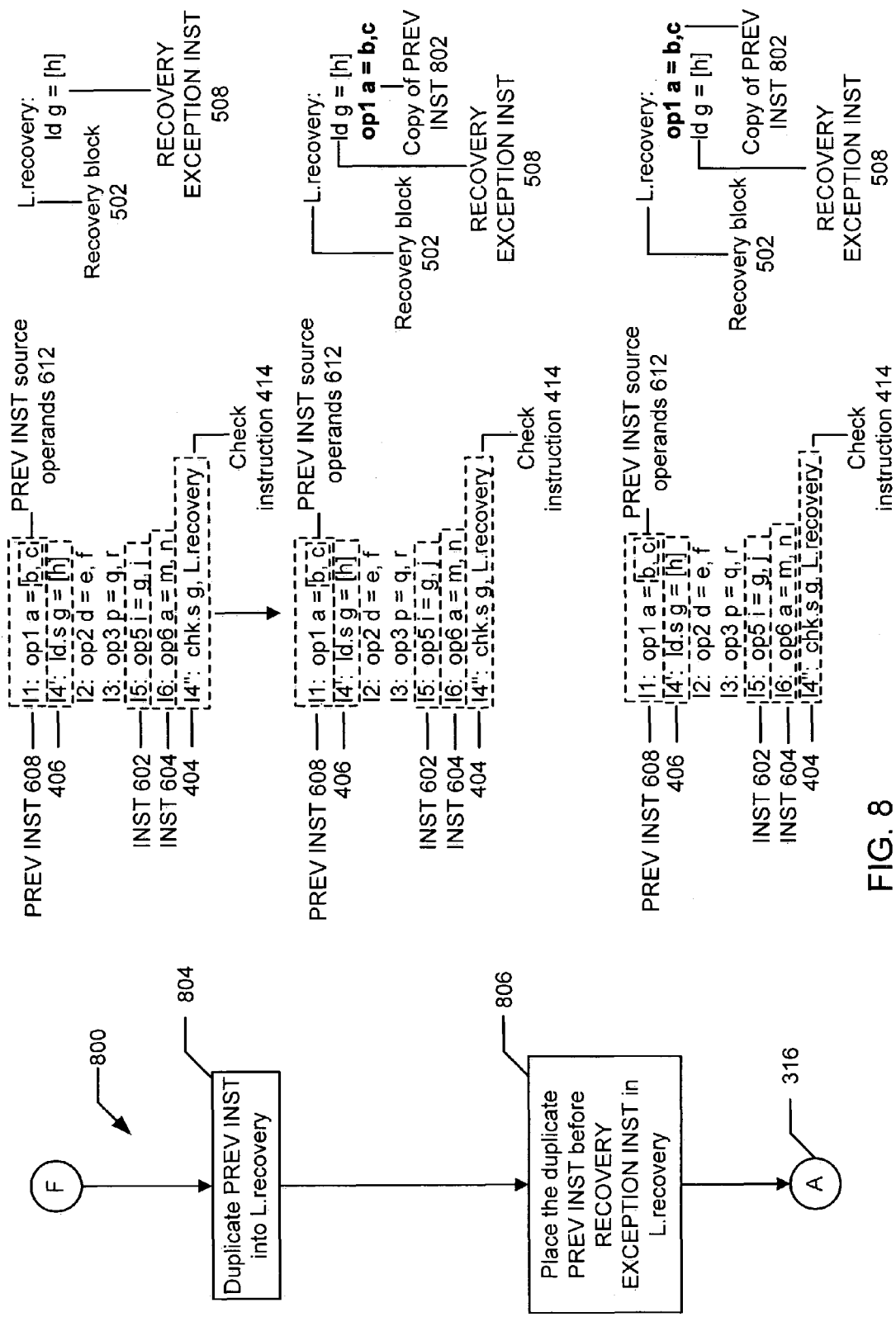
FIG. 8 is a flowchart representative of example machine readable instructions which may be executed by a device to implement an exemplary embodiment of a method of reordering instructions upward across a check instruction, wherein a target register associated with the instructions is independent of the excepting instruction.

If PREV INST's source operands 612 are available at the check instruction 414 (block 614), then a process 800 begins (see FIG. 8). In an exemplary embodiment, in FIG. 6, PREV INST 608 is the previous instruction associated with INST 604. The operands b and c are I's source operands 612. At the time the check instruction 414 is executed, the values of b and c have not been changed and are considered available at the check instruction 414.

The process 800 makes a copy of PREV INST 802 and places the copy of PREV INST 802 into the recovery block 502 (block 804). The copy of PREV INST 802 is placed before RECOVERY EXCEPTION INST 508 in the recovery block 502 (block 806). When the copy of PREV INST 802 is executed, it restores the value of the target register. Since the values of the source operands 612 are available at the check instruction 414, the process 800 can restore INST 604's target register state by re-executing PREV INST 802 in the recovery block 502. This leads to the correct value in the target register since the contents of the source operands b and c 612 have not changed.

With the recovery block 502 containing an instruction to restore INST's target register, the process 800 exits and returns to the process 300. The process 300 continues and determines if any code motion candidates still remain (block 302).

Returning to FIG. 3, if INST will not be moved upward across a check instruction (e.g. check instruction 414) such that INST executes at an earlier time (block 310), the process 300 determines if INST will be moved downward across a check instruction 414, such that INST executes at a later time (block 312). Some compiler or binary translator applications may determine, in a well known manner, that moving INST downward is advantageous. In an exemplary embodiment, INST may be moved downward to prevent stalls in a pipeline. An exemplary embodiment of this situation is when a first instruction which modifies a memory location is immediately followed by a second instruction which reads from that same memory location. The read instruction may be a candidate to be moved downwards. By moving the instruction downward, delays in the pipeline associated with the first instruction's writing to a memory location and the second instruction's need to access the same memory location may be eliminated.

Figure 9:
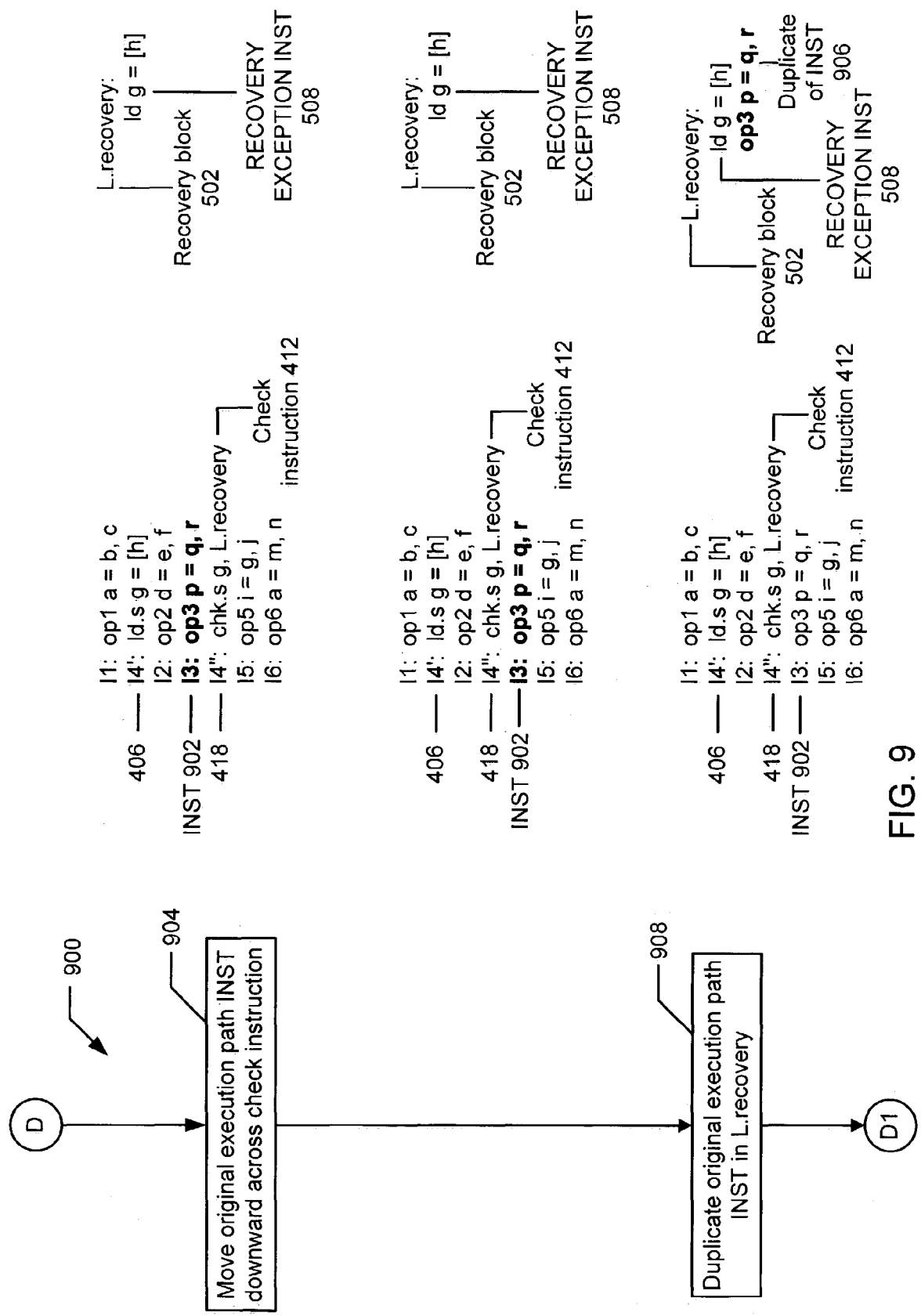
FIG. 9 is a flowchart representative of example machine readable instructions which may be executed by a device to implement an exemplary embodiment of a method of reordering instructions downward across a check instruction.
Figure 10:
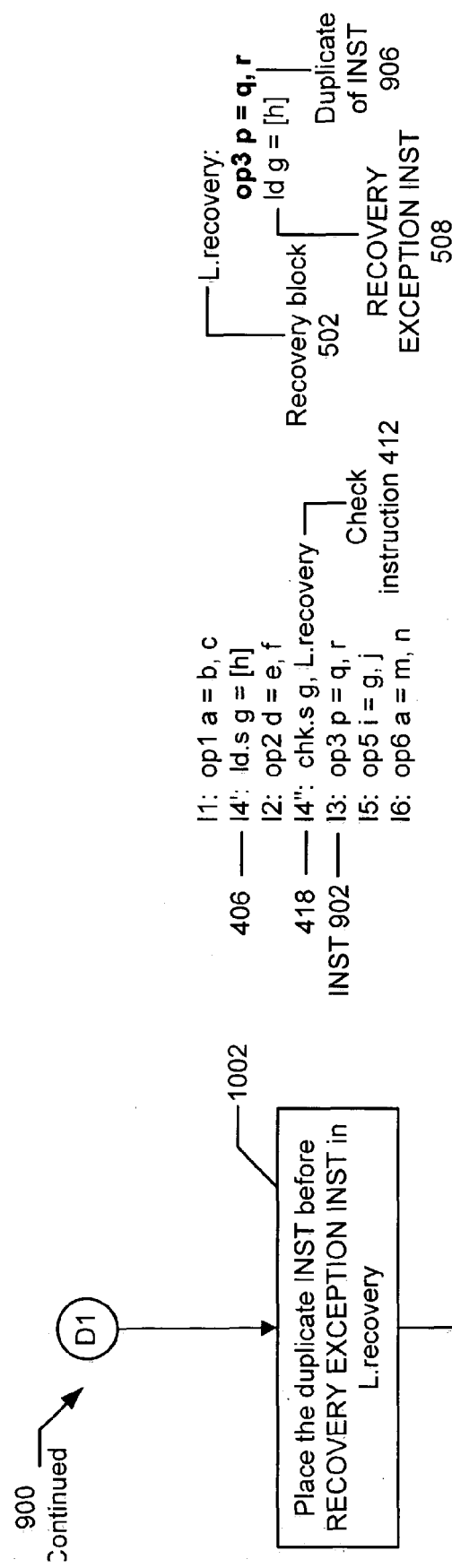
FIG. 10 is a continuation of the flowchart shown in FIG. 9.

If INST will be moved downward across the check instruction 414, process 900 begins (see FIG. 9). INST 902 is an exemplary embodiment of INST that is recorded downward across the check instruction 414. Process 900 moves INST 902 downward across the check instruction 414 (block 904). A duplicate of INST 902 (i.e., instruction 906) is then placed in the recovery block 502 (block 908). The duplicate of INST 906 is placed before RECOVERY EXCEPTION INST 508 (block 1002 of FIG. 10). Since INST 902 is moved downward across the check instruction 414, INST 902 will not be executed at the time the program flow reaches the check instruction 414. By placing a duplicate of INST 906 in the recovery block 502 and having the duplicate of INST 906 execute before the RECOVERY EXCEPTION INST 508, the effects of reordering INST 902 are reverted.

Following the generation of the appropriate recovery block 502, the process 900 exits and returns to the process 300. Next, the process 300 continues and determines if any code motion candidates still remain (block 302).

Returning to FIG. 3, if INST is not an excepting instruction (block 308), and INST is not being moved upward across a check instruction 414 (block 310), and INST is not being moved downward across a check instruction 414 (block 312), then normal code motion is executed in a well known manner (block 314). Subsequently the process 300 continues and determines if any code motion candidates still remain (block 302).

Although the above discloses example systems including, among other components, software executed on hardware, it should be noted that such systems are merely illustrative and should not be considered as limiting. In an exemplary embodiment, it is contemplated that any or all of the disclosed hardware and software components could be embodied exclusively in dedicated hardware, exclusively in software, exclusively in firmware or in some combination of hardware, firmware and/or software.

In addition, although certain methods, apparatus, and articles of manufacture have been described herein, the scope of coverage of this patent is not limited thereto. On the contrary, this patent covers all apparatuses, methods and articles of manufacture fairly falling within the scope of the appended claims either literally or under the doctrine of equivalents.

What is claimed is:

1. A method of preserving exceptions in code reordering, the method comprising:
   receiving a plurality of instructions including a first instruction;
   determining if the first instruction is an excepting instruction;
   determining if the first instruction is to be moved upward across a check instruction;
   determining a second instruction in the plurality of instructions that computes a previous value of a target register associated with the first instruction when the first instruction is not an excepting instruction and the first instruction is to be moved upward across a check instruction;
   determining if a source operand associated with the second instruction is available at the check instruction;
   inserting a third instruction into the plurality of instructions to save the value of the target register if the source operand associated with the second instruction is not available at the check instruction; and
   inserting a fourth instruction into a recovery block to restore the value of the target register.

2. A method as defined in claim 1, further comprising inserting a copy of the second instruction into the recovery block if the source operand associated with the second instruction is available at the check instruction.

3. A method as defined in claim 2, wherein inserting a copy of the second instruction into the recovery block comprises inserting a copy of the second instruction into the recovery block ahead of a copy of the excepting instruction.

4. A method of preserving exceptions in code reordering, the method comprising:
   receiving a plurality of instructions including a first instruction;
   determining that the first instruction is an excepting instruction;
   determining if the first instruction is to be moved upward across a check instruction;
   determining if the first instruction is to be moved downward across the check instruction; and
   inserting a copy of the first instruction into a recovery block in response to determining that (i) the first instruction is not an excepting instruction, (ii) the first instruction is not to be moved upward across a check instruction, and (iii) the first instruction is to be moved downward across a check instruction.

5. A method as defined in claim 4, wherein inserting a copy of the first instruction into the recovery block comprises inserting a copy of the first instruction into the recovery block ahead of a copy of the excepting instruction.

6. A machine readable medium structured to cause a machine to:
- receive a plurality of instructions including a first instruction;
- determine if the first instruction is an excepting instruction;
- determine if the first instruction is to be moved upward across a check instruction;
- determine a second instruction in the plurality of instructions that computes a previous value of a target register associated with the first instruction when the first instruction is not an excepting instruction and the first instruction is to be moved upward across a check instruction;
- determine if a source operand associated with the second instruction is available at the check instruction;
- insert a third instruction into the plurality of instructions to save the value of the target register if the source operand associated with the second instruction is not available at the check instruction; and
- insert a fourth instruction into a recovery block to restore the value of the target register.

7. A machine readable medium as defined in claim 6, wherein a copy of the second instruction is inserted in the recovery block if the source operand associated with the second instruction is available at the check instruction.

8. A machine readable medium as defined in claim 7, wherein a copy of the second instruction inserted in the recovery block comprises a copy of the second instruction inserted into the recovery block ahead of a copy of the excepting instruction.

9. A machine readable medium structured to cause a machine to:
- receive a plurality of instructions including a first instruction;
- determine if the first instruction is an excepting instruction;
- determine if the first instruction is to be moved upward across a check instruction;
- determine if the first instruction is to be moved downward across the check instruction; and
- insert a copy of the first instruction into a recovery block in response to determining that (i) the first instruction is not an excepting instruction, (ii) the first instruction is not to be moved upward across a check instruction, and (iii) the first instruction is to be moved downward across a check instruction.

10. A machine readable medium as defined in claim 9, wherein a copy of the first instruction inserted into the recovery block comprises a copy of the first instruction inserted into the recovery block ahead of an excepting instruction.

* * * * *